Jan. 13, 1942.  E. A. KRAEMER  2,270,061
SERVING GRILL
Filed Aug. 10, 1938
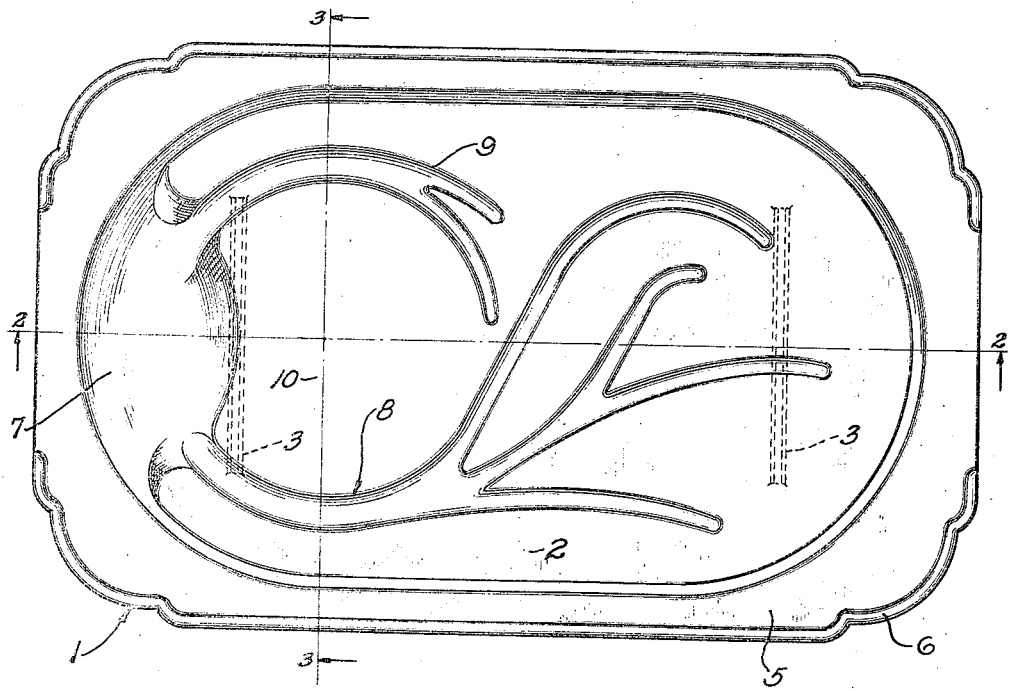
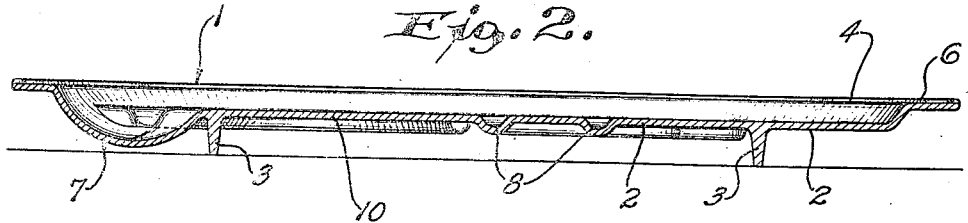
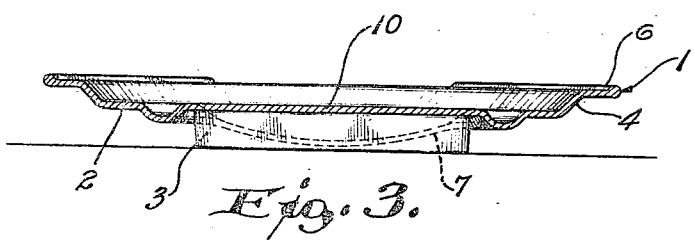
INVENTOR.
ELMORE A. Kraemer
BY John W. Michael
ATTORNEYS.

Patented Jan. 13, 1942

2,270,061

UNITED STATES PATENT OFFICE 2,270,061

SERVING GRILL

Elmore A. Kraemer, West Bend, Wis., assignor to West Bend Aluminum Company, West Bend, Wis., a corporation of Wisconsin Application August 10, 1938, Serial No. 224,079

1 Claim. (Cl. 65—15)

This invention relates to an improvement in grills or platters of the type designed to be used for carving and serving roasts, meats, fowl and the like.

Platters of this type have been provided adjacent one end thereof with a gravy well into which the gravy and juices drain from a gravy tree extending lengthwise of the platter. As heretofore proposed, the gravy tree had its branches fairly well distributed over the entire area of the platter on which carving is customarily done and as a result it was difficult to carve the meat or roast since the knife would depress portions of the meat into the branches of the gravy tree, interfering with a complete, clean cut and resulting in tearing of the meat and in general otherwise rendering the operation awkward and more or less unsatisfactory.

One of the objects of the present invention is to provide a platter of this character which has a gravy well and a gravy tree but has the gravy tree so constituted and the platter otherwise so constructed and interrelated with the gravy tree as to provide a flat smooth carving area of substantial dimensions thereby making it practical and convenient to make complete clean cuts and avoid tearing of the roast or meat.

Other objects and advantages reside in certain novel features of the construction, arrangement, and combination of parts which will be hereinafter more fully described and particularly pointed out in the appended claim, reference being had to the accompanying drawing forming a part of this specification, and in which:

Figure 1 is a plan view of a platter embodying the present invention;

Figure 2 is a view thereof in longitudinal vertical section taken on line 2—2 of Figure 1; and Figure 3 is a view in transverse vertical section taken on line 3—3 of Figure 1.

Referring to the drawing, the numeral 1 designates generally a platter embodying the present invention. In the structure shown, the platter 1 may be constituted of aluminum, cast or moulded in the form shown, but of course it may also be constructed of various other materials and may be fashioned in any suitable way. The platter 1 has a body portion 2 of oblong form and which may have integral therewith supporting feet or pads 3 projecting downwardly from the underside of the body portion and extending transversely thereof adjacent the opposite ends of the platter.

The body portion is surrounded by an integral marginal flange or rim 4 which has its horizontal portion 5 suitably beaded and ornamented as at 6.

At one end of the platter the body portion 2 is provided with a depression or gravy well 7 into which drain the branches or grooves of a gravy tree designated at 8 and 9. These branches or grooves of the gravy tree are so interrelated with the body portion and so disposed with respect to each other as to make it practical to provide a flat carving area 10 of substantial dimensions adjacent the gravy well. As illustrated in the drawing, the branches 8 and 9 of the gravy tree communicate with the opposite side of the gravy well 7 and first curved away from each other around the margin of the carving area or surface 10 and then curved toward each other and are subdivided into additional branches as shown.

With a construction of this kind, the carver may readily and easily cleanly and completely cut slices of meat or roast from the portion thereof which rests on the carving surface or area 10 and in addition to this the device has the advantage of leaving the grooves or branches of the gravy tree unobstructed so that the gravy drains into the well and may be readily dispensed therefrom.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claim.

The invention claimed is:

A platter of the character described comprising a body portion and a surrounding rim, said body portion having a single gravy well at one end, an area of the body portion immediately adjacent said well being of flat and unbroken surface and of sufficient extent to provide a carving surface, said well and unbroken area utilizing substantially half of said body portion, the remaining area of said body portion being provided with gravy tree branches draining said area, and gravy tree trunks connecting said branches to said well, said trunks being disposed around the margin of said unbroken area.

ELMORE A. KRAEMER.